US012063416B2

(12) United States Patent
Sawarkar et al.

(10) Patent No.: US 12,063,416 B2
(45) Date of Patent: Aug. 13, 2024

(54) CONTEXTUAL SMART SWITCHING VIA MULTI-MODAL LEARNING MECHANISM

(71) Applicant: INTERNATIONAL BUSINESS MACHINES CORPORATION, Armonk, NY (US)

(72) Inventors: Kunal Sawarkar, Franklin Park, NJ (US); Craig M. Trim, Ventura, CA (US); Shikhar Kwatra, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 208 days.

(21) Appl. No.: 17/454,314

(22) Filed: Nov. 10, 2021

(65) Prior Publication Data

US 2023/0144326 A1 May 11, 2023

(51) Int. Cl.
*H04N 21/466* (2011.01)
*H04N 21/439* (2011.01)
*H04N 21/44* (2011.01)
*H04N 21/454* (2011.01)

(52) U.S. Cl.
CPC ....... *H04N 21/454* (2013.01); *H04N 21/4394* (2013.01); *H04N 21/44008* (2013.01); *H04N 21/4663* (2013.01); *H04N 21/4666* (2013.01)

(58) Field of Classification Search
CPC ............. H04N 21/454; H04N 21/4663; H04N 21/4666; H04N 21/4394; H04N 21/44008
See application file for complete search history.

(56) References Cited

U.S. PATENT DOCUMENTS

| 7,269,330 | B1 * | 9/2007 | Iggulden ............ H04N 21/4334 386/250 |
| 9,679,332 | B2 | 6/2017 | Kim |
| 10,387,857 | B2 | 8/2019 | Kim |
| 10,580,043 | B2 | 3/2020 | Publicover |
| 11,468,476 | B1 * | 10/2022 | Lundsgaard ............ H04L 65/61 |
| 2004/0261096 | A1 * | 12/2004 | Matz ................ H04N 21/26603 725/135 |
| 2008/0297669 | A1 * | 12/2008 | Zalewski .............. H04L 65/611 712/228 |

(Continued)

FOREIGN PATENT DOCUMENTS

CN 102547403 B 6/2014

OTHER PUBLICATIONS

Basagni et al., "Finding MARLIN: Exploiting Multi-Modal Communications for Reliable and Low-latency Underwater Networking," IEEE INFOCOM 2017—IEEE Conference on Computer Communications, Downloaded Aug. 30, 2021, https://ieeexplore.ieee.org/stamp/stamp.jsp?tp=&arnumber=8057132, 9 pages.

(Continued)

*Primary Examiner* — Pinkal R Chokshi
(74) *Attorney, Agent, or Firm* — Elliot J. Shine

(57) ABSTRACT

The present invention may include a computer receives multimedia data. The computer parses the multimedia data into an audio stream. The computer analyzes the audio stream to identify recognized patterns. The computer calculates a probability of an undesired content based on the recognized patterns and taking an action based on determining the probability is above a threshold.

18 Claims, 5 Drawing Sheets

(56) References Cited

U.S. PATENT DOCUMENTS

| | | | |
|---|---|---|---|
| 2009/0102973 A1* | 4/2009 | Harris | H04N 21/44008 348/565 |
| 2011/0069940 A1* | 3/2011 | Shimy | H04N 21/44218 386/296 |
| 2011/0157475 A1 | 6/2011 | Wright | |
| 2015/0120336 A1* | 4/2015 | Grokop | G06Q 40/08 705/4 |
| 2020/0029128 A1* | 1/2020 | Erskine | H04N 21/25866 |
| 2020/0053312 A1* | 2/2020 | Mukherjee | H05B 47/19 |
| 2021/0195286 A1* | 6/2021 | Lohumi | H04N 21/812 |
| 2021/0306561 A1* | 9/2021 | VanBlon | H04N 5/272 |

OTHER PUBLICATIONS

Disclosed Anonymously, "Intelligent Maintenance Scheduler Based on Contextual Analysis," IP.com, IP.com No. IPCOM000266230D, IP.com Publication Date: Jun. 24, 2021, 11 pages.

Disclosed Anonymously, Intervening Out-of-School children using an economic cost model, IP.com, IP.com No. IPCOM000263952D, IP.com Publication Date: Oct. 27, 2020, 10 pages.

Disclosed Anonymously, "Smart Command Line Contextualization Mechanism," IP.com, IP.com No. IPCOM000261052D, IP.com Publication Date: Jan. 22, 2020, 5 pages.

Kavitha et al., Smart Home Systems Using Wireless Sensor Network—A Comparative Analysis, International Journal of Computer Engineering and Technology (IJCET), vol. 3, Issue 3, Oct.-Dec. (2012), pp. 94-103.

Mell et al., "The NIST Definition of Cloud Computing", National Institute of Standards and Technology, Special Publication 800-145, Sep. 2011, 7 pages.

\* cited by examiner

CONTEXTUAL SMART SWITCHING VIA MULTI-MODAL LEARNING MECHANISM

BACKGROUND

The present invention relates, generally, to the field of computing, and more particularly to utilization of machine learning in video and natural language processing.

Multimedia is a form of communication that combines different content forms such as text, audio, images, animations, and video into a single presentation. Multimedia may include mass media, such as video, TV, radio, and analog or live audio and video streams. Popular examples of multimedia include video podcasts, audio slideshows and streaming of live video or radio channels. Multimedia may be recorded for playback and storage on various electronic devices, either utilizing on demand or in real time (streaming) methods.

The information in multimedia streams, typically comes as different modalities. For example, images are usually associated with tags and text explanations and video may contain images, faces and text. Different modalities are characterized by very different statistical properties. For instance, images are typically represented as pixel intensities or outputs of feature extractors, while texts are represented as discrete word count vectors. Due to the distinct statistical properties of different information resources, it is very important to discover the relationship between different modalities. Multimodal learning is a good model to represent the joint representations of different modalities. The multimodal learning model is also capable of filling a missing modality given the observed modalities.

SUMMARY

According to one embodiment, a method, computer system, and computer program product for contextual stream switching is provided. The present invention may include a computer receives multimedia data. The computer parses the multimedia data into an audio stream. The computer analyzes the audio stream to identify recognized patterns. The computer calculates a probability of an undesired content based on the recognized patterns and taking an action based on determining the probability is above a threshold.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
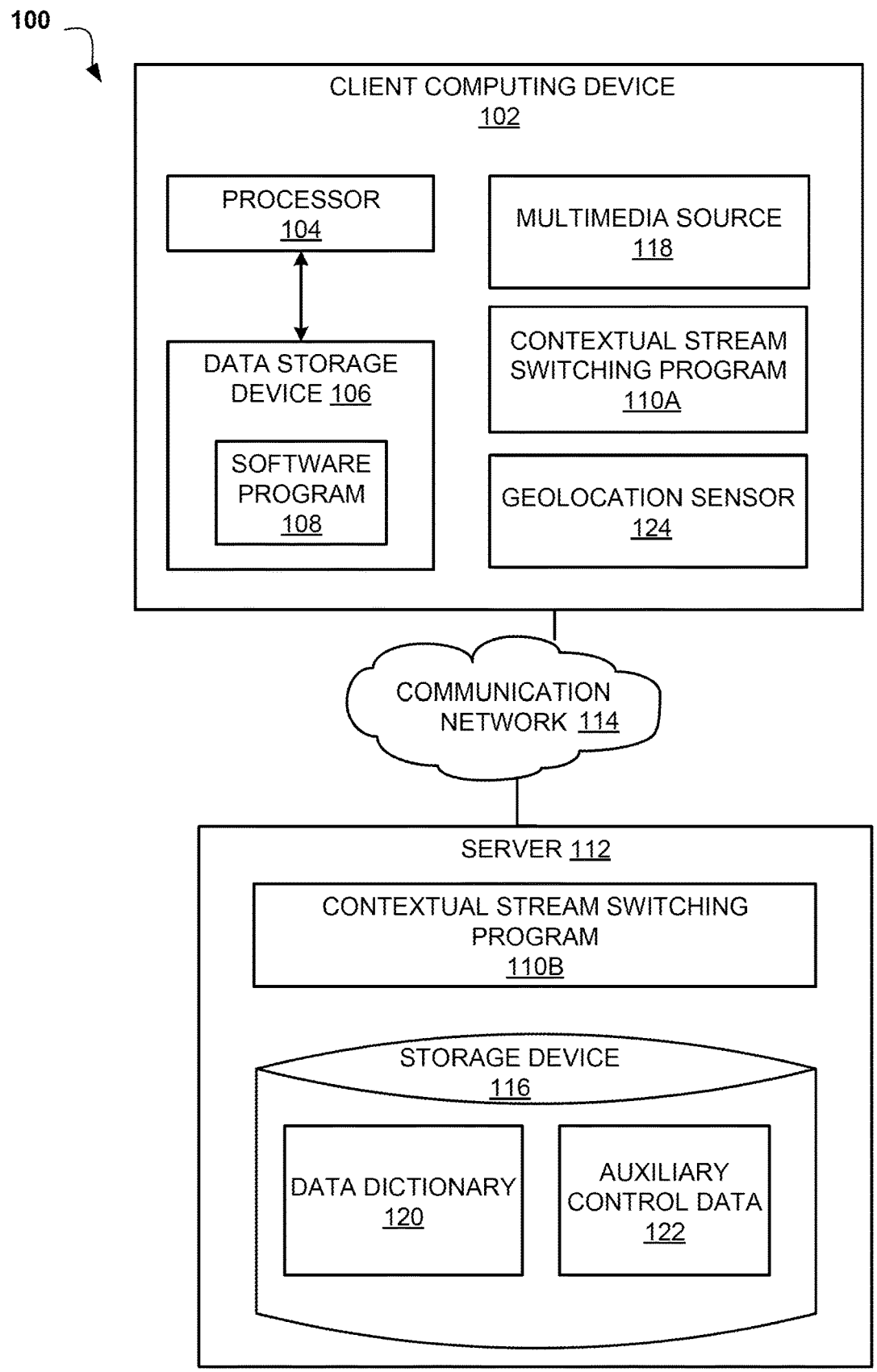
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to utilization of machine learning in video and natural language processing. The following described exemplary embodiments provide a system, method, and program product to, among other things, automatically switch content by recognizing undesired content in a video or audio stream using a multi-modal machine learning approach while taking contextual parameters under consideration. Therefore, the present embodiment has the capacity to improve the technical field of natural language processing, video data processing, and machine learning by identifying an undesired content in a stream and acting upon determining the undesired content based on user prior behavior.

As previously described, the information in multimedia streams, typically comes as different modalities. For example, images are usually associated with tags and text explanations and video may contain images, faces and text. Different modalities are characterized by very different statistical properties. For instance, images are typically represented as pixel intensities or outputs of feature extractors, while texts are represented as discrete word count vectors. Due to the distinct statistical properties of different information resources, it is very important to discover the relationship between different modalities. Multimodal learning is a good model to represent the joint representations of different modalities. The multimodal learning model is also capable of filling a missing modality given the observed modalities.

Video and audio streams and even TV and radio stations typically integrate frequent advertisements, profane language, annoying sound or other undesired content that may annoy or distract users, especially during a highly dangerous task such as driving. In another embodiment, the user may be concentrated on important tasks, such as a video conference, broadcast or webinar, and does not wish to be interrupted. Frequently, the moment a user identifies undesired content, the user may switch to a different channel, stream or reduce a volume or turn off the screen. This action of interacting with the computing device may be dangerous, especially when the user is occupied with another task, such as driving a vehicle or operating other dangerous instrumentalities, because the user frequently loses attention while reducing sound volume, switching a channel or interacting with a streaming device that may lead to an accident. As such, it may be advantageous to, among other things, implement a system that identifies undesired content and automatically performing an action that the user would have performed in a similar situation.

According to one embodiment, a contextual stream switching program may utilize pattern recognition to identify undesired content, such as advertisement patterns, profane language, or profane signs in audio and video data of a multimedia stream. Furthermore, the contextual stream switching program may predict the undesired content using predictive analysis and historical data and monitor contextual risk factors to take ameliorative actions such as automatically switching to an alternative stream or reducing sound volume.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to analyze a multimedia stream during runtime and based on identifying an undesired content, the described exemplary embodiments perform ameliorative actions autonomously, such as switching to another stream or reducing the volume, in order to maintain user's attention.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 that is enabled to host and run a software program 108 and a contextual stream switching program 110A, a multimedia source 118, a geolocation sensor 124. data storage device 106 Client computing device 102 may communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, a smart TV, a smartphone, a smart radio receiver or any type of computing device capable of running a program and accessing a network. As will be discussed with reference to FIG. 3, the client computing device 102 may include internal components 302a and external components 304a, respectively. The multimedia source 118 may be a video stream, an audio stream or a multimedia file that is executed by the processor 104. The geolocation sensor 124 may be a global positioning sensor (GPS), a Bluetooth or a Wi-Fi sensor capable of determining a location and a speed of the client computing device 102 using a triangulation or other method. In another embodiment, the geolocation sensor 124 may be any device capable of determining a location or state pf the user such as an accelerometer, a camera coupled with image processing device, a heartbeat monitor or other device capable of identifying that the user is under stress or concentrated on a specific or dangerous task.

The server computer 112 may be a laptop computer, netbook computer, personal computer (PC), a desktop computer, or any programmable electronic device or any network of programmable electronic devices capable of hosting and running a contextual stream switching program 110B and a storage device 116 and communicating with the client computing device 102 via the communication network 114, in accordance with embodiments of the invention. The storage device 116 may be configured to store data dictionary 120 and an auxiliary control data 122. The data dictionary 120 may be a record or a database that stores signature keywords or training data used by the contextual stream switching program 110A, 110B, such as brand name photographs, logos, profane words or symbols, restricted images and trademarks to identify an undesired content in the audio or video streams. The auxiliary control data 122 may be a database or a record set that comprises alternative streams or commands the user frequently performs manually while listening to each of the available streams or encountering an undesired content such as volume changes, turning off video. In another embodiment, the auxiliary control data 122 may include typical duration of undesired content in a stream and alternative streams or channels that the user prefers or choses when encountering an undesired content. As will be discussed with reference to FIG. 3, the server computer 112 may include internal components 302b and external components 304b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the contextual stream switching program 110A, 110B may be a program capable of contextual stream switching based on analyzing video and audio streams of the multimedia content, especially during runtime. The program analyzes the multimedia content using machine learning methods and when an undesired content is identified, the program switches to another stream or takes other actions based on user preferences and prior user behavior. The contextual stream switching method is explained in further detail below with respect to FIG. 2.

Figure 2:
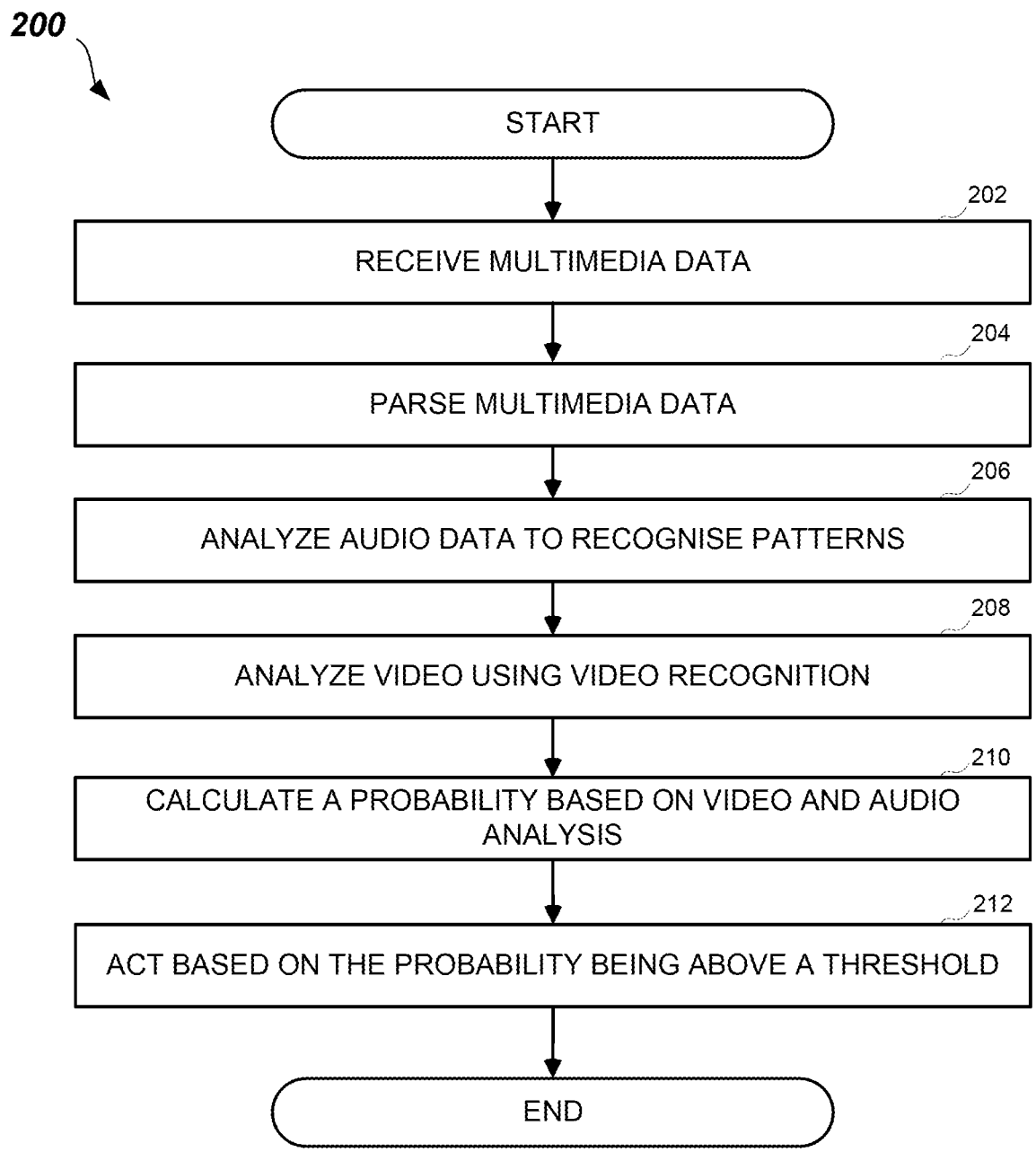
FIG. 2 is an operational flowchart illustrating a contextual switching via multi-modal learning process according to at least one embodiment.

Referring now to FIG. 2, an operational flowchart illustrating a contextual stream switching process 200 is depicted according to at least one embodiment. At 202, the contextual stream switching program 110A, 110B receives multimedia data. According to an example embodiment, the contextual stream switching program 110A, 110B may determine the active multimedia stream utilizing application programming interface (API), such as by intercepting and analyzing incoming audio or video streams. In another embodiment, the contextual stream switching program 110A, 110B may convert an analog stream such as a radio or TV channel into a digital multimedia stream using an analog to digital data converter during runtime.

Next, at 204, the contextual stream switching program 110A, 110B parses the multimedia data. According to an example embodiment, the contextual stream switching program 110A, 110B may parse the multimedia data into an audio stream using an in-line audio extractor or other known technique. The contextual stream switching program 110A, 110B may store the parsed audio with parsed images or frames extracted from the video and added audit trails for future analysis.

Then, at 206, the contextual stream switching program 110A, 110B analyzes audio data to recognize patterns. According to an example embodiment, the contextual stream switching program 110A, 110B may perform a speech recognition of the audio data using the Gaussian mixture model or using a trained neural network, such as IBM Watson® (IBM Watson and all IBM Watson-based trademarks and logos are trademarks or registered trademarks of International Business Machines Corporation and/or its affiliates). In another embodiment, the contextual stream switching program 110A, 110B may use any other known statistical inference model. The speech recognition may receive a waveform of audio data and produce a transcription of the words being uttered. In order to increase accuracy of speech recognition, the contextual stream switching program 110A, 110B may use a statistical approach, such as by implementing a Bayes' theorem, that takes into account a prior pattern.

Next, at 208, the contextual stream switching program 110A, 110B analyzes video using video recognition. According to an example embodiment, the contextual stream switching program 110A, 110B may utilize a trained convolutional neural network (CNN), or a trained deep learning model to analyze the video stream and identify that the video includes an image that matches with the set of images such as brand names, logos, trademarks or other training data stored in the data dictionary 120. In another embodiment, the contextual stream switching program 110A, 110B may detect rapid change of facial characters that may be detected using a facial recognition model (based on the trained neural network). For example, when the characters (faces) change rapidly (e.g. every 10-15 seconds) the contextual stream switching program 110A, 110B may infer that the advertisement is currently streamed. In further embodiment, the contextual stream switching program 110A, 110B may implement a Champion Challenger method to utilize all of the methods of the aforementioned embodiments. The Champion Challenger method is a technique that allows to monitor decisions of both of the embodiments (image matching and frequency of image changing methods) to identify the most successful embodiment in real time by distributing requests between all of the embodiments and using a variant decision logic to identify the outperforming embodiment. In further embodiments, the contextual stream switching program 110A, 110B may analyze video for parameters, such as change in bit rates, frequency of change of characters, scenarios and speed of videos relative to previously played multimedia content.

Then, at 210, the contextual stream switching program 110A, 110B calculates a probability based on video and audio analysis. According to an example embodiment, the contextual stream switching program 110A, 110B may use a trained Bayes model that analyzes both an audio probability and a video probability to identify an updated combined probability to determine whether an undesired content, such as an advertisement, is being streamed during runtime. For example, if c is a specific class and t is text where P(c) and P(t) are prior probabilities of this class and this text, and P(t|c) is the probability the text appears given this class, where the value of class c may be either POSITIVE or NEGATIVE, and t is an analytical entity. Thus, the contextual stream switching program 110A, 110B may choose the value of c to maximize P(c|t) where P(wi|c) is the probability of the i-th feature in text t appears given class c may be determined utilizing the following:

$$P(c\mid t) = \frac{P(c)P(t\mid c)}{P(t)}, \text{log likelihood} = \log P(c) + \sum i \log P(wi\mid c)$$

Where parameters of P(c) and P(wi|c) are trained based on the samples of the Naive Bayes model and where, the contextual stream switching program 110A, 110B may take the class with the highest log likelihood as a prediction. Then, the contextual stream switching program 110A, 110B may determine that the calculated probability refers to an undesired content, such as an advertisement, when the probability is above a threshold value. For example if a log likelihood is above the threshold value that is set by a user, the current stream is an advertisement. In addition, the contextual stream switching program 110A, 110B may add a risk score that represents a state of the user using a geolocation sensor 124. For example, if a geolocation sensor 124 is a GPS, the contextual stream switching program 110A, 110B may identify that the user is at high risk because he is driving a car based on determining a speed of the client computing device 102, or alternatively, determine a risk factor by analyzing the surrounding of the user if a geolocation sensor 124 is a camera. In another embodiment, the contextual stream switching program 110A, 110B may set a score representing a risk of the contextual situation and integrate it in the probability of the stream being an undesired content. In a further embodiment, the contextual stream switching program 110A, 110B may utilize logistic regression model to generate a multi-level classifier output highlighting the risk score pertaining to the contextual situation gathered from external sensors, such as based on the data from the geolocation sensor 124.

Next, at 212, the contextual stream switching program 110A, 110B acts based on the probability being above a threshold. As previously mentioned, the contextual stream switching program 110A, 110B may compare the calculated probability to the threshold value set by a user and based on the probability being above a threshold value, change the stream to an alternative stream identified from the auxiliary control data 122 by sending instructions to the client computing device 102. In another embodiment, the contextual stream switching program 110A, 110B may take into account the risk score being above a risk threshold value in order to change the stream to an alternative stream identified from the auxiliary control data 122, or a combination of both the risk and the probability. In further embodiments, the contextual stream switching program 110A, 110B may perform other actions, such as reduce volume when an undesired content is detected or mute the stream completely. In another embodiment, the contextual stream switching program 110A, 110B may present an action to a user using a graphical user interface and, based on approval of the user, add associated audio and video data to the data dictionary 120 for retraining of the neural network or usage by the statistical models in the future.

It may be appreciated that FIG. 2 provides only an illustration of one implementation and does not imply any limitations with regard to how different embodiments may be implemented. Many modifications to the depicted environments may be made based on design and implementation requirements. For example, the contextual stream switching program 110A, 110B may blur or turn off a video display based on determining undesired content coupled with volume reduction or volume muting.

Figure 3:
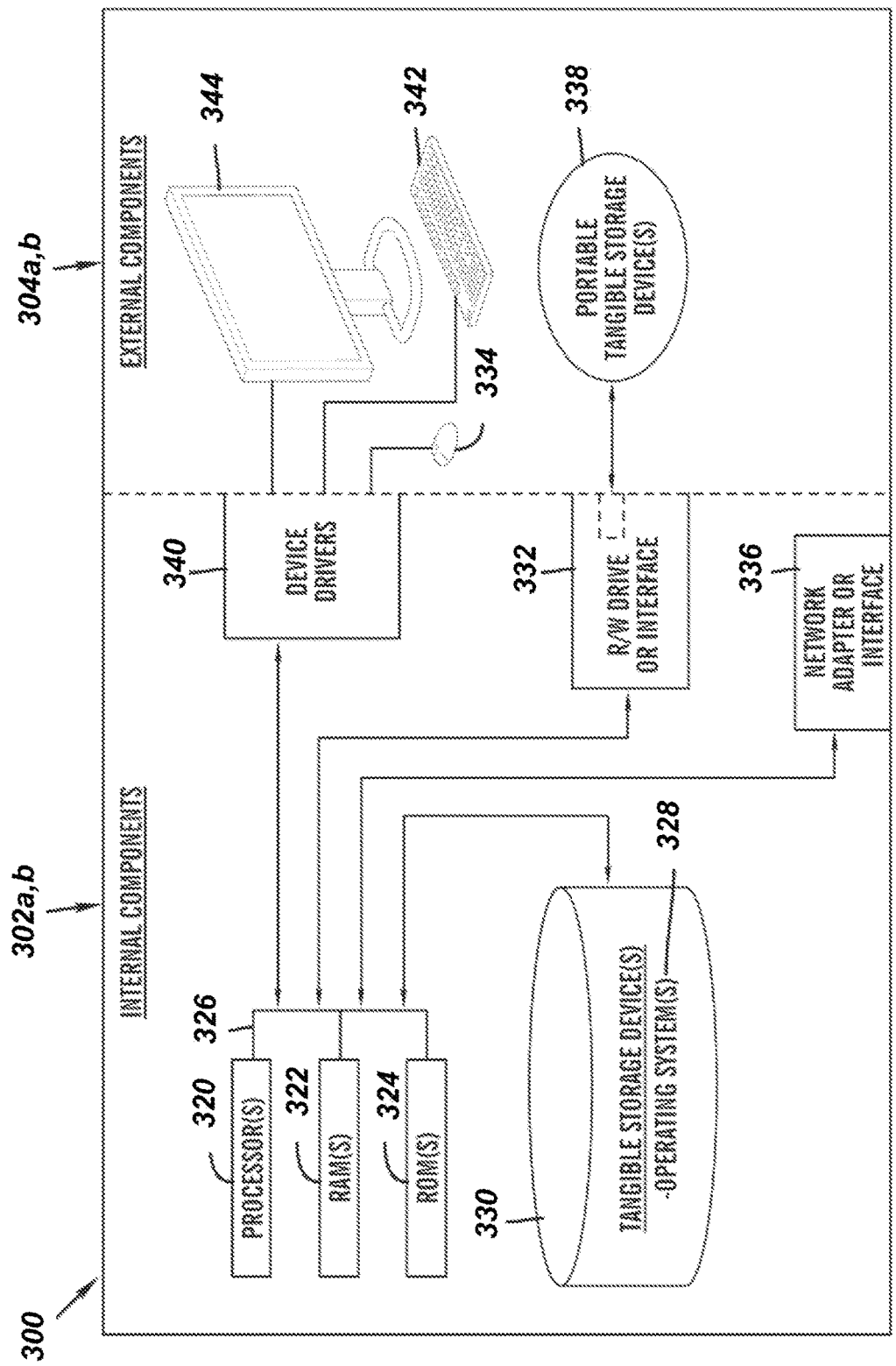
FIG. 3 is a block diagram of internal and external components of computers and servers depicted in FIG. 1 according to at least one embodiment.

FIG. 3 is a block diagram 300 of internal and external components of the client computing device 102 and the server 112 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 302, 304 is representative of any electronic device capable of executing machine-readable program instructions. The data processing system 302, 304 may be representative of a smart phone, a computer system, PDA, or other electronic devices. Examples of computing systems, environments, and/or configurations that may be represented by the data processing system 302, 304 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 302 a,b and external components 304 a,b illustrated in FIG. 3. Each of the sets of internal components 302 include one or more processors 320, one or more computer-readable RAMs 322, and one or more computer-readable ROMs 324 on one or more buses 326, and one or more operating systems 328 and one or more computer-readable tangible storage devices 330. The one or more operating systems 328, the software program 108 and the contextual stream switching program 110A in the client computing device 102, and the contextual stream switching program 110B in the server 112 are stored on one or more of the respective computer-readable tangible storage devices 330 for execution by one or more of the respective processors 320 via one or more of the respective RAMs 322 (which typically include cache memory). In the embodiment illustrated in FIG. 3, each of the computer-readable tangible storage devices 330 is a magnetic disk storage device of an internal hard drive. Alternatively, each of the computer-readable tangible storage devices 330 is a semiconductor storage device such as ROM 324, EPROM, flash memory or any other computer-readable tangible storage device that can store a computer program and digital information.

Each set of internal components 302 a,b also includes a R/W drive or interface 332 to read from and write to one or more portable computer-readable tangible storage devices 338 such as a CD-ROM, DVD, memory stick, magnetic tape, magnetic disk, optical disk or semiconductor storage device. A software program, such as the contextual stream switching program 110A, 110B, can be stored on one or more of the respective portable computer-readable tangible storage devices 338, read via the respective R/W drive or interface 332, and loaded into the respective hard drive 330.

Each set of internal components 302 a,b also includes network adapters or interfaces 336 such as a TCP/IP adapter cards, wireless Wi-Fi interface cards, or 3G or 4G wireless interface cards or other wired or wireless communication links. The software program 108 and the contextual stream switching program 110A in the client computing device 102 and the contextual stream switching program 110B in the server 112 can be downloaded to the client computing device 102 and the server 112 from an external computer via a network (for example, the Internet, a local area network or other, wide area network) and respective network adapters or interfaces 336. From the network adapters or interfaces 336, the software program 108 and the contextual stream switching program 110A in the client computing device 102 and the contextual stream switching program 110B in the server 112 are loaded into the respective hard drive 330. The network may comprise copper wires, optical fibers, wireless transmission, routers, firewalls, switches, gateway computers and/or edge servers.

Each of the sets of external components 304 a,b can include a computer display monitor 344, a keyboard 342, and a computer mouse 334. External components 304 a,b can also include touch screens, virtual keyboards, touch pads, pointing devices, and other human interface devices. Each of the sets of internal components 302 a,b also includes device drivers 340 to interface to computer display monitor 344, keyboard 342, and computer mouse 334. The device drivers 340, R/W drive or interface 332, and network adapter or interface 336 comprise hardware and software (stored in storage device 330 and/or ROM 324).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
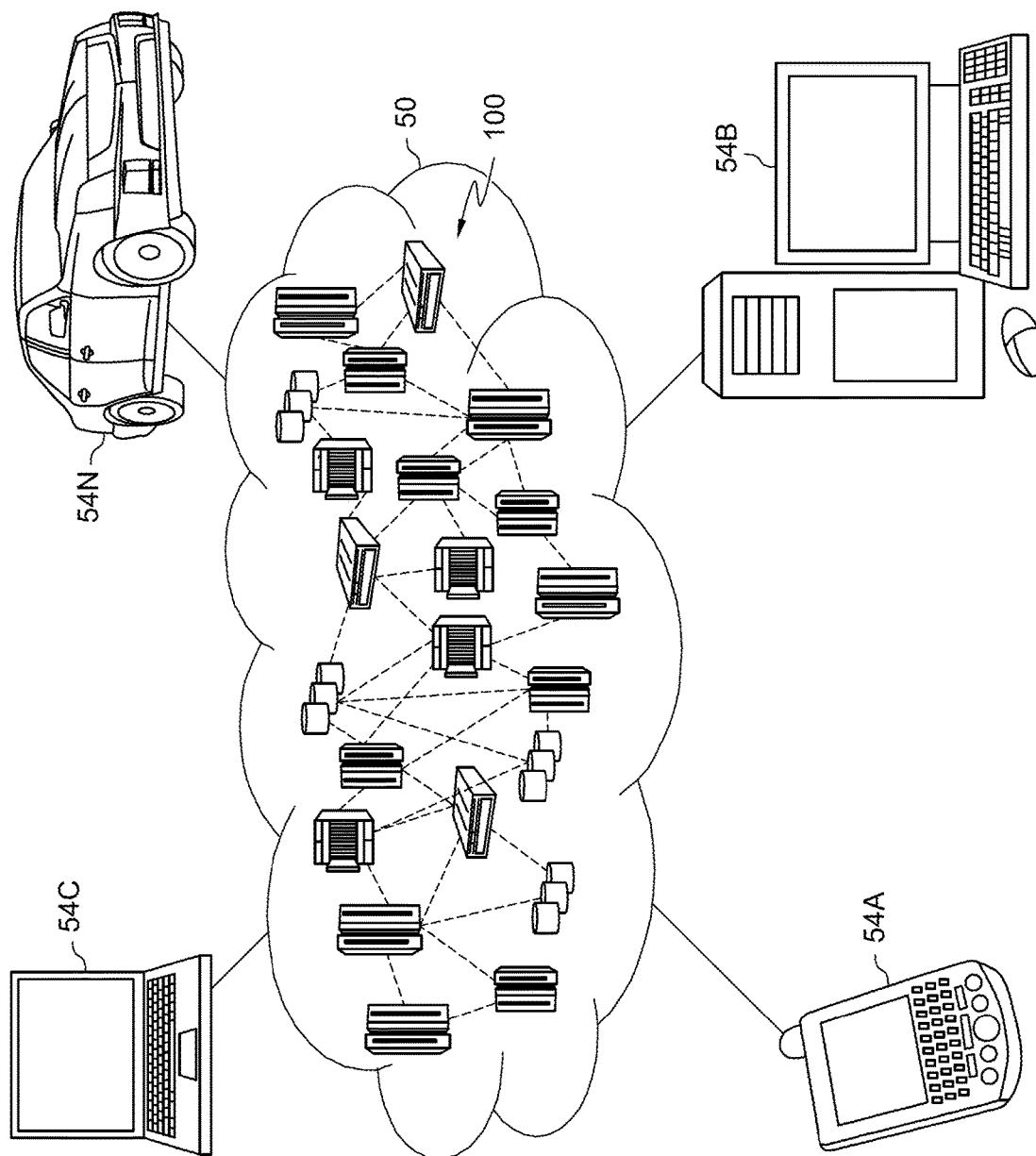
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
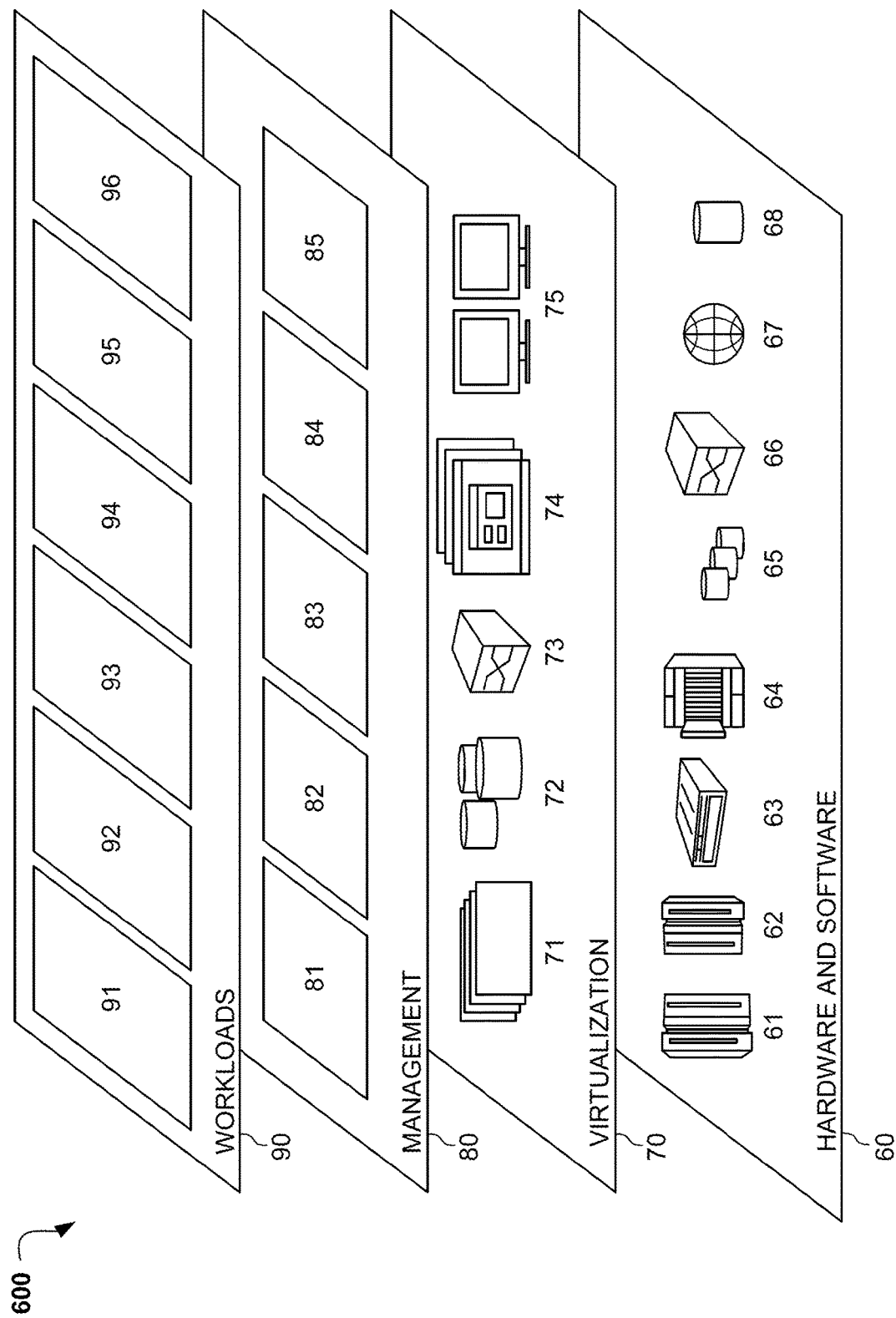
FIG. 5 depicts abstraction model layers according to an embodiment of the present invention.

Referring now to FIG. 5, a set of functional abstraction layers 500 provided by cloud computing environment 50 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and contextual stream switching 96. Contextual stream switching 96 may relate to analyzing multimedia streams to identify undesired content and, based on determining the presence of undesired content, perform an action that was previously performed by the user, such as changing a stream or reducing volume level until the end of the undesired content in the stream.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for contextual stream switching in an environment, the method comprising:

receiving multimedia data, wherein the multimedia data includes at least one of an audio steam or video stream;

parsing the audio stream or the video stream from the multimedia data;

identifying recognized audio patterns within the multimedia data by analyzing the audio stream using a Gaussian mixture model and identifying recognized video patterns by analyzing the video stream using a trained convolutional neural network (CNN), wherein the trained CNN is trained to identify at least brand names in an image;

identifying a user context relative to the environment in user movement data, wherein the user movement data is obtained from the environment using a sensor;

determining a risk score based on the user context relative to the environment, wherein the risk score is associated with the user and the environment;

calculating a probability of undesired content based on the recognized audio patterns or the recognized video patterns and the risk score, wherein the probability of undesired content is determined using a highest log likelihood output of a trained Bayes model, and wherein the probability of undesired content is updated for the video stream based on at least recognized video patterns; and performing an action when the probability is above a threshold, wherein the action causes a computing device to switch to an alternative stream.

2. The processor-implemented method of claim 1, wherein the probability of the undesired content is above a threshold value set by the user.

3. The processor-implemented method of claim 1, wherein the risk score is at least in part determined from a state of the user derived from a geolocation sensor.

4. The processor-implemented method of claim 1, further comprising:

utilizing a logistic regression model to generate a multi-level classifier output highlighting the risk score pertaining to the user context.

5. The processor-implemented method of claim 1, wherein prior to perform the action a graphical user interface is presented to the user, wherein the graphical user interface enables the user to switch to the alternative stream.

6. The processor-implemented method of claim 5, the audio stream or the video stream is stored in a data dictionary along with feedback received from the user within the graphical user interface, wherein the feedback is utilized in retraining the CNN or determining future probabilities of undesired content.

7. A computer system for contextual stream switching in an environment, the computer system comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

receiving multimedia data, wherein the multimedia data includes at least one of an audio steam or video stream;

parsing the audio stream or the video stream from the multimedia data;

identifying recognized audio patterns within the multimedia data by analyzing the audio stream using a Gaussian mixture model and identifying recognized video patterns by analyzing the video stream using a trained convolutional neural network (CNN), wherein the trained CNN is trained to identify at least brand names in an image;

identifying a user context relative to the environment in user movement data, wherein the user movement data is obtained from the environment using a sensor;

determining a risk score based on the user context relative to the environment, wherein the risk score is associated with the user and the environment;

calculating a probability of undesired content based on the recognized audio patterns or the recognized video patterns and the risk score, wherein the probability of undesired content is determined using a highest log likelihood output of a trained Bayes model, and wherein the probability of undesired content is updated for the video stream based on at least recognized video patterns; and performing an action when the probability is above a threshold, wherein the action causes a computing device to switch to an alternative stream.

8. The computer system of claim 7, wherein the probability of the undesired content is above a threshold value set by the user.

9. The computer system of claim 7, wherein the risk score is at least in part determined from a state of the user derived from a geolocation sensor.

10. The computer system of claim 7, further comprising:

utilizing a logistic regression model to generate a multi-level classifier output highlighting the risk score pertaining to the user context.

11. The computer system of claim 7, wherein prior to perform the action a graphical user interface is presented to the user, wherein the graphical user interface enables the user to switch to the alternative stream.

12. The computer system of claim 11, the audio stream or the video stream is stored in a data dictionary along with feedback received from the user within the graphical user interface, wherein the feedback is utilized in retraining the CNN or determining future probabilities of undesired content.

13. A computer program product for contextual stream switching in an environment, the computer program product comprising:

a non-transitory computer-readable storage medium having program instructions embodied therewith, the program instructions executable by a processor to cause the processor to perform a method comprising:

receiving multimedia data, wherein the multimedia data includes at least one of an audio steam or video stream;

parsing the audio stream or the video stream from the multimedia data;

identifying recognized audio patterns within the multimedia data by analyzing the audio stream using a Gaussian mixture model and identifying recognized video patterns by analyzing the video stream using a trained convolutional neural network (CNN), wherein the trained CNN is trained to identify at least brand names in an image;

identifying a user context relative to the environment in user movement data, wherein the user movement data is obtained from the environment using a sensor;

determining a risk score based on the user context relative to the environment, wherein the risk score is associated with the user and the environment;

calculating a probability of undesired content based on the recognized audio patterns or the recognized video patterns and the risk score, wherein the probability of undesired content is determined using a highest log likelihood output of a trained Bayes model, and wherein the probability of undesired content is updated for the video stream based on at least recognized video patterns; and performing an action when the probability is above a threshold, wherein the action causes a computing device to switch to an alternative stream.

14. The computer program product of claim 13, wherein the probability of the undesired content is above a threshold value set by the user.

15. The computer program product of claim 13, wherein the risk score is at least in part determined from a state of the user derived from a geolocation sensor.

16. The computer program product of claim 13, further comprising:

utilizing a logistic regression model to generate a multi-level classifier output highlighting the risk score pertaining to the user context.

17. The computer program product of claim 13, wherein prior to perform the action a graphical user interface is presented to the user, wherein the graphical user interface enables the user to switch to the alternative stream.

18. The computer program product of claim 17, the audio stream or the video stream is stored in a data dictionary along with feedback received from the user within the graphical user interface, wherein the feedback is utilized in retraining the CNN or determining future probabilities of undesired content.

* * * * *